Figure 1:
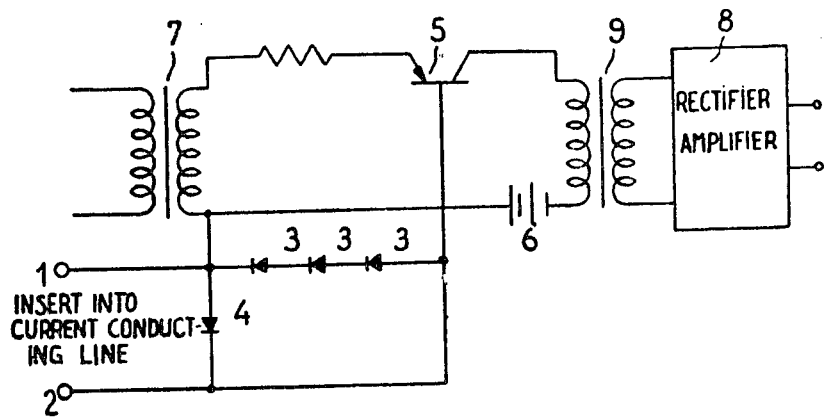

United States Patent

[11] 3,604,948

[72] Inventors Jacques Dutilloeil;
 Joseph Claes, both of Mont-sur-Marchienne, Belgium
[21] Appl. No. 26,267
[22] Filed Apr. 7, 1970
[45] Patented Sept. 14, 1971
[73] Assignee Ateliers De Constructions Electriques De Charleroi (ACEC), Societe Anonyome Charleroi, Belgium
[32] Priority Nov. 4, 1965
[33] Belgium
[31] 671859
 Continuation of application Ser. No. 591,533, Nov. 2, 1966.

[54] SAFETY DISCRIMINATOR DEVICE
 1 Claim, 2 Drawing Figs.
[52] U.S. Cl. .................................................. 307/235,
 307/217, 307/255
[51] Int. Cl. ..................................................... H03k 5/20
[50] Field of Search............................................. 307/235,
 255, 254, 250, 217

[56]             References Cited
         UNITED STATES PATENTS
2,816,238  12/1957  Elliott............................. 307/250

3,086,125  4/1963  Gumin........................... 307/217
3,192,399  6/1965  Ih ................................... 307/255
3,344,331  9/1967  Adler............................. 307/254
3,403,332  9/1968  Watanaba...................... 324/57

Primary Examiner—Donald D. Forrer
Assistant Examiner—David M. Carter
Attorney—Raymond A. Robic ABSTRACT: A discriminator device for detecting if a current or a voltage is below or above a predetermined threshold which includes an amplification element having first and second main electrodes and a control electrode, and a DC power source connected between the main electrodes of the amplification element. An alternating current generator is connected between one pole of the power source and the first main electrode, and an alternating current detector is connected between the other pole of the power source and the second main electrode, said detector being sensitive to an alternating current having an intensity above a predetermined level. In addition, an input circuit is connected to the control electrode of the amplification element and this input circuit includes means for generating a DC voltage drop for biasing the amplification element which is independent of the strength of the current flowing therethrough, this input circuit being adapted to control the gain of the amplification element.

INVENTORS
Jacques DUTILLOEIL
Joseph CLAES

ATTORNEY

SAFETY DISCRIMINATOR DEVICE

This application is a continuation of application 591,533 filed Nov. 2, 1966.

The present invention relates to a discriminator device for detecting if a current or a voltage is below or above a predetermined threshold which can be variable. The discriminator device does not emit any signal or emits an output signal, according to whether or not the predetermined threshold is traversed. If the device is faulty, it does not emit any output signal. The device is therefore a safety one in relation to the predetermined condition detected by the appearance of an output signal.

In its most simple conception, the discriminator device according to the invention makes it possible to detect if, in its input circuit, a current flows in one direction or the other. The discriminator device according to the invention is characterized by an input circuit in which is provided a device generating a voltage drop independent of the strength of the current flowing therethrough, by an amplification element connected to a power source and the control circuit of which contains the said input circuit as well as a device for the generation of an oscillation, and by an output circuit sensitive to the oscillation amplified in the amplification element.

Generally, a reference or ordering current or voltage and the current or voltage to be detected act on the control electrodes of two amplification elements, each arranged in series with a DC power source in one branch of a bridge connected in parallel with the device defined above.

Figure 2:
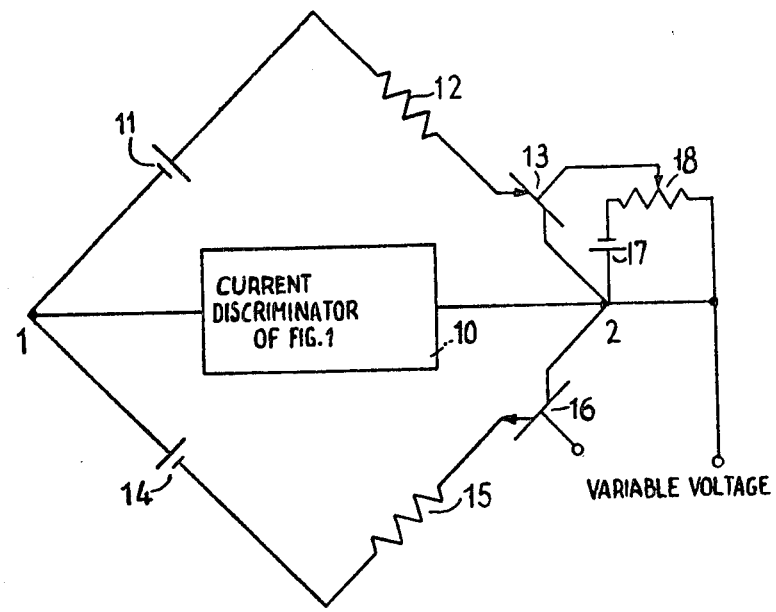

The invention is described hereinbelow in relation to two embodiments, the electrical diagrams of which are illustrated in FIGS. 1 and 2 of the appended drawing.

FIG. 1 is the electrical diagram of a very simple safety discriminator device. It comprises an input circuit drawn in heavy lines between two input terminals 1 and 2. In this input circuit is arranged a device generating a voltage drop independent of the current strength that flows through it, in this instance three diodes 3 arranged in series to allow the current to flow through from the terminal 2 to the terminal 1 and a diode 4 to allow the current to flow through from the terminal 1 to the terminal 2. During the passage of the current in one direction or the other, a small negative or positive biasing voltage is generated; it is used to bias an amplification element, for instance a transistor 5, connected to a power source 6. The control circuit of this transistor 5, mounted between the base and the emitter, contains the said input circuit and a device capable of generating an oscillation. This latter device may be an input transformer 7 the secondary winding of which is arranged in the circuit between the base and the emitter of transistor 5. When the biasing voltage between the emitter and the base is negative, the working point of the transistor 5 is in the range of proportional amplification so that the oscillation generated in the secondary winding of the transformer 7 is amplified and appears at the collector of transistor 5. The amplitude of the output of transistor 5 is then high enough to be detected by a rectifier-amplifier circuit 8 connected to the output circuit of transistor 5 through a transformer 9. Rectifier-amplifier 8 is a rectifier followed by a DC amplifier having a threshold level below which the DC amplifier does not provide any output. In this case, the discriminator device then emits an output signal. On the other hand, if the current in the input circuit flows in reverse direction, so that the voltage between the emitter and the base is positive, the transistor 5 is cut off and the oscillation existing in the control circuit is not transmitted to the output circuit. Because of this fact, the discriminator device does not emit any output signal. The same is true if the device fails for some reason, such as a break in the circuit, a short circuit in the diodes 3, 4 or in the transistor 5. In any situation, the transistor 5 will emit an output signal only when it is biased in the range of proportional amplification, that is when it is not cut off or saturated. The characteristic of such a transistor may be similar to the one found in U.S. Pat. application Ser. No. 591,546 filed Nov. 2, 1966, and more particularly in FIG. 6 of such application.

It is also to be understood that, in the case of a short circuit across the main electrodes of transistor 5, the AC signal originating from transformer 7 will be applied directly to rectifier 8 and will not be amplified by transistor 5. In such a case, the signal applied to the DC amplifier of the rectifier-amplifier 8 will not exceed its threshold level and the output of the rectifier-amplifier 8 will be null.

In FIG. 2, the device according to FIG. 1 is numbered 10. The input terminals 1 and 2 of device 10 are connected to two branches of a bridge, one of the said branches comprising, conveniently oriented, a DC source 11, a resistance 12 and a transistor 13, the other, a DC source 14, a resistance 15 and a transistor 16. If the current in branch 11, 12, 13 is greater than the current in branch 14, 15, 16, an equilibrating component goes through device 10 in the direction of terminal 2 towards terminal 1. At that moment, the discriminator device emits an output signal. In the reverse case, this equilibrating current component takes the reverse direction that is from terminal 1 towards terminal 2, and the discriminator device does not emit any output signal. The strength of the current in branch 11, 12, 13 may be controlled by the amplification device or the transistor 13 as a function of an external current or voltage. The same is true for the amplification device or the transistor 16 in relation to the strength of the current in branch 14, 15, 16. If one of the valves of voltage or current applied either on transistor 13 or on transistor 16 represents a fixed or variable reference such as the DC voltage of source 17 and variable resistance 18, for instance, the other value of the voltage or the current is an output of a measuring apparatus. The safety discriminator device then makes it possible to control with safety if a measured value is always above an ordering value or if a measured value is always below an ordering value. The order may represent for instance a maximum speed, a minimum pressure, etc., that vary with the conditions of use but which may not, in any case, be exceeded.

The embodiments of the invention in which an exclusive property or privilege is claimed are defined as follows:

1. A discriminator device for detecting if a current of a voltage is below or above a predetermined threshold, including:
   a. an amplification element having first and second main electrodes and a control electrode;
   b. a DC power source connected between the main electrodes of said amplification element;
   c. an alternating current generator connected between one pole of said power source and said first main electrode;
   d. an alternating current detector connected between the other pole of said power source and said second main electrode, said detector being sensitive to an alternating current having an intensity above a predetermined level;
   e. an input circuit connected to said control electrode and including means for generating a DC voltage drop for biasing said amplification element to a value for which the working point of the amplification element is in the range of proportional amplification, said means being connected to an external current source and being sensitive to the direction of the current flowing therethrough, but being independent of the strength of the said current; and
   f. a bridge having two branches parallel connected to the input terminal of said input circuit; each bridge branch comprising a DC source, a resistance and an amplification element on the control electrode of which an external voltage or current is applied.